US010429951B2

(12) United States Patent
Zhang et al.

(10) Patent No.: US 10,429,951 B2
(45) Date of Patent: Oct. 1, 2019

(54) MOUSE DEVICE WITH ADJUSTABLE MOVING RESOLUTION

(71) Applicant: Primax Electronics Ltd., Taipei (TW)

(72) Inventors: Shi-Jie Zhang, Taipei (TW);
Chih-Feng Chien, Taipei (TW);
A-Ming Chang, Taipei (TW);
Ying-Che Tseng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 151 days.

(21) Appl. No.: 15/676,376

(22) Filed: Aug. 14, 2017

(65) Prior Publication Data

US 2018/0275777 A1    Sep. 27, 2018

(30) Foreign Application Priority Data

Mar. 24, 2017   (TW) .............................. 106109932 A

(51) Int. Cl.
*G06F 3/0354*   (2013.01)
*G06F 3/03*     (2006.01)

(52) U.S. Cl.
CPC ........ *G06F 3/03543* (2013.01); *G06F 3/0317* (2013.01)

(58) Field of Classification Search
CPC ........................... G06F 3/03543; G06F 3/0317
See application file for complete search history.

(56) References Cited

U.S. PATENT DOCUMENTS

| 2,687,669 | A  | * | 8/1954  | Bolsey    | G03B 19/18 |
|           |    |   |         |           | 352/142    |
| 8,212,777 | B2 | * | 7/2012  | Itagaki   | G06F 3/03543 |
|           |    |   |         |           | 345/165    |
| 8,803,805 | B2 | * | 8/2014  | Chang     | G06F 3/0317 |
|           |    |   |         |           | 345/163    |
| 8,933,355 | B2 | * | 1/2015  | Lan       | G06F 3/03543 |
|           |    |   |         |           | 200/337    |
| 9,001,043 | B2 | * | 4/2015  | Chang     | G06F 3/03543 |
|           |    |   |         |           | 345/163    |
| 9,013,514 | B2 | * | 4/2015  | Bochniak  | G06F 3/0354 |
|           |    |   |         |           | 345/684    |
| 9,772,695 | B2 | * | 9/2017  | Wang      | G06F 3/03543 |
| 9,816,587 | B2 | * | 11/2017 | Koike     | F16H 1/46  |
| 10,108,276| B2 | * | 10/2018 | Zhang     | G06F 3/0317 |
| 2007/0020013 | A1 | * | 1/2007 | McAlindon | G06F 3/0213 |
|           |    |   |         |           | 400/489    |

(Continued)

*Primary Examiner* — William Boddie
*Assistant Examiner* — Bipin Gyawali
(74) *Attorney, Agent, or Firm* — Kirton McConkie; Evan R. Witt

(57) ABSTRACT

A mouse device includes a mouse casing, a circuit board, a first sensing module, a second sensing module and a switching module. The circuit board is disposed within the mouse casing. Both of the first sensing module and the second sensing module are disposed on the circuit board and partially exposed outside the mouse casing. The switching module is partially exposed outside a base of the mouse casing. The first sensing module or the second sensing module is exposed outside the base under control of the switching module. Consequently, a moving resolution of the mouse device is adjustable according to the practical requirements. The switching module has a simple mechanism for changing the moving resolution of the mouse device in a simple manner.

9 Claims, 9 Drawing Sheets

(56) References Cited

U.S. PATENT DOCUMENTS

| | | | | |
|---|---|---|---|---|
| 2007/0247421 A1* | 10/2007 | Orsley | ............... | G06F 3/0362 345/156 |
| 2012/0256837 A1* | 10/2012 | Chang | ............... | G06F 3/03544 345/163 |
| 2018/0224954 A1* | 8/2018 | Chiang | ............... | G06F 3/03545 |
| 2018/0275775 A1* | 9/2018 | Zhang | ............... | G06F 3/03544 |
| 2018/0275777 A1* | 9/2018 | Zhang | ............... | G06F 3/0317 |
| 2019/0121452 A1* | 4/2019 | Hsueh | ............... | G06F 3/0362 |

* cited by examiner

MOUSE DEVICE WITH ADJUSTABLE MOVING RESOLUTION

FIELD OF THE INVENTION

The present invention relates to an input device, and more particularly to a mouse device for controlling the movement of a cursor.

BACKGROUND OF THE INVENTION

The widely-used input device of a computer includes for example a mouse device, a keyboard device, a trackball device, a touchpad device, or the like. Among these input devices, the mouse device is the most prevailing because it is very easy-to-use for most users. When a mouse device is held by the palm of a user, the user may move the mouse device to control the movement of a cursor shown on a display screen of a computer.

Hereinafter, the structure and the function of a conventional mouse device will be illustrated with reference to FIG. 1. FIG. 1 schematically illustrates the connection between a conventional mouse device and a computer system. The computer system 2 comprises a computer host 21 and a display screen 22. The computer host 21 is in communication with a mouse device 1 and the display screen 22. The computer host 21 has a connecting port 211. A graphic-based window 221 and a cursor 222 are shown on the display screen 22. The mouse device 1 is used for controlling the cursor 222 to have the computer host 21 execute a corresponding command. The mouse device 1 comprises a main body 10, a left button 11, a right button 12, a scroll wheel 13, and a connecting cable 14. The left button 11 is disposed on the main body 10 and located at a left side of the scroll wheel 13. In addition, the left button 11 is exposed outside the main body 10. By pressing down the left button 11, a left button signal is generated. Like the left button 11, the right button 12 is disposed on the main body 10 and located at a right side of the scroll wheel 13. By pressing down the right button 12, a right button signal is generated. The scroll wheel 13 is disposed within the main body 10 and partially exposed outside the main body 10. By rotating the scroll wheel 13, a corresponding scrolling signal is generated. The connecting cable 14 is connected with the main body 10 and protruded outside the main body 10. When the connecting cable 14 is connected with the connecting port 211, the communication between the mouse device 1 and the computer system 2 is established.

The inner structure of the conventional mouse device will be described as follows. FIG. 2 is a schematic cross-sectional view illustrating the structure of the conventional mouse device. The main body 10 of the mouse device 1 is placed on a working surface T. The inner portion of the mouse device 1 comprises a circuit board 15, a sensing module 16 and a controlling unit 17. The sensing module 16 is disposed on the circuit board 15 and partially exposed to a bottom opening 101 of the main body 10. The sensing module 16 comprises a light-emitting element 161, an optical assembly 162 and an optical sensor 163. The light-emitting element 161 is disposed on the circuit board 15. Moreover, the light-emitting element 161 emits a light beam B. The optical assembly 162 is disposed within the main body 10. After the light beam B passes through the optical assembly 162, the light beam B is refracted by the optical assembly 162. Consequently, the light beam B is projected onto the working surface T, which is disposed under the main body 10. After the light beam B reflected by the working surface T is received by the optical sensor 163, a displacement signal is generated by the optical sensor 163 according to the light beam B. The control unit 17 is disposed on the circuit board 15 and electrically connected with the optical sensor 163.

The method of generating the displacement signal will be described as follows. When the mouse device 1 is placed on the working surface T but not moved, the light-emitting element 161 emits the light beam B. After the light beam B passes through the optical assembly 162, the light beam B is refracted by the optical assembly 162. Consequently, the light beam B is projected onto the working surface T. Then, the light beam B is reflected to the optical assembly 162 by the working surface T. After the light beam B passes through the optical assembly 162, the light beam B is received by the optical sensor 163. Meanwhile, the optical sensor 163 generates a first working surface image. When the mouse device 1 is placed on the working surface T and moved to a specified position, the light beam B from the first light-emitting element 161 is guided to the optical sensor 163 by the optical assembly 162, the working surface T and the optical assembly 162 sequentially. Meanwhile, the optical sensor 163 generates a second working surface image.

Then, the controlling unit 17 receives the first working surface image and the second working surface image from the optical sensor 163. According to the result of comparing the first working surface image with the second working surface image, the controlling unit 17 acquires a displacement amount of the main body 10 relative to the working surface T and generates a displacement signal according to the displacement amount. That is, when the mouse device 1 is moved on the working surface T, the sensing module 16 detects the displacement amount of the main body 10 relative to the working surface T and generates the displacement signal according to the displacement amount. After the displacement signal is received by the computer host 21, the movement of the cursor 222 on the display screen 22 is controlled by the computer host 21 according to the displacement signal.

With increasing development of mouse devices, the functions of the mouse devices are gradually increased. For example, the moving resolution of the mouse device is largely increased. The moving resolution of the mouse device denotes the sensitivity of moving the cursor of the computer host when the mouse device is moved for a certain distance. As the moving resolution is increased, the sensitivity of moving the cursor is increased. When the mouse device is used to operate the computer game, it is necessary to move the mouse device quickly. That is, the higher moving resolution of the mouse device is required. When the mouse device is used to perform a document processing task, the lower moving resolution of the mouse device is required. For preventing the user from frequently changing the suitable mouse device, a mouse device with a changeable moving resolution has been introduced into the market. This mouse device has a switching element for changing the moving resolution of the mouse device in response to the pressing action of the user. When the switching element is pressed down once, the moving resolution of the mouse device is changed. For example, the moving resolution is changed from 800 dots per inch (dpi) to 1600 dpi. When the switching element is pressed down again, the moving resolution is changed from 1600 dpi to 800 dpi. In other words, the moving resolution of the mouse device is changeable.

Although the moving resolution of the mouse device is changeable, there are still some drawbacks. For example, this mouse device cannot be applied to all kinds of working surfaces. In case that the working surface is made of a transparent material (e.g., acrylic resin), the light beam is transmissible through the working surface. Since the reflected portion of the light beam is reduced, the efficacy of generating the displacement signal is adversely affected.

Therefore, there is a need of providing a mouse device that has the adjustable moving resolution and is applicable to various working surfaces.

SUMMARY OF THE INVENTION

The present invention provides a mouse device that has the adjustable moving resolution and is applicable to various working surfaces.

In accordance with an aspect of the present invention, there is provided a mouse device. The mouse device is in communication with a computer system for controlling movement of a cursor of the computer system. The mouse device includes a mouse casing, a circuit board, a first sensing module, a second sensing module and a switching module. The mouse casing includes a base, an upper cover, a receiving recess, a first casing opening and a second casing opening. The base is covered by the upper cover. The receiving recess is formed in the base and arranged between the base and the upper cover. The first casing opening is formed in the base. The second casing opening is formed in the base and located near the first casing opening. The circuit board is located over the receiving recess. The first sensing module is disposed on the circuit board. A part of the first sensing module is selectively exposed outside the second casing opening. The second sensing module is disposed on the circuit board. A part of the second sensing module is selectively exposed outside the second casing opening. The switching module is partially received within the receiving recess and partially exposed outside the first casing opening. One of the first sensing module and the second sensing module is exposed outside the second casing opening under control of the switching module. Consequently, a moving resolution of the mouse device is adjustable.

From the above descriptions, the mouse device of the present invention comprises plural sensing modules. The suitable sensing module corresponding to the selected moving resolution is used according to the corresponding requirement. The mechanical structure of the switching module cooperates with the simple detecting element and the controlling unit to achieve the function of switching the sensing module. Consequently, the mouse device of the present invention is simple and cost-effective. Since the mouse device is equipped with different kinds of sensing modules, the suitable sensing module is selected according to the type of the working surface. In other words, the mouse device of the present invention is suitably operated on various working surfaces.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks of the conventional technologies, the present invention provides a mouse device.

Figure 1:
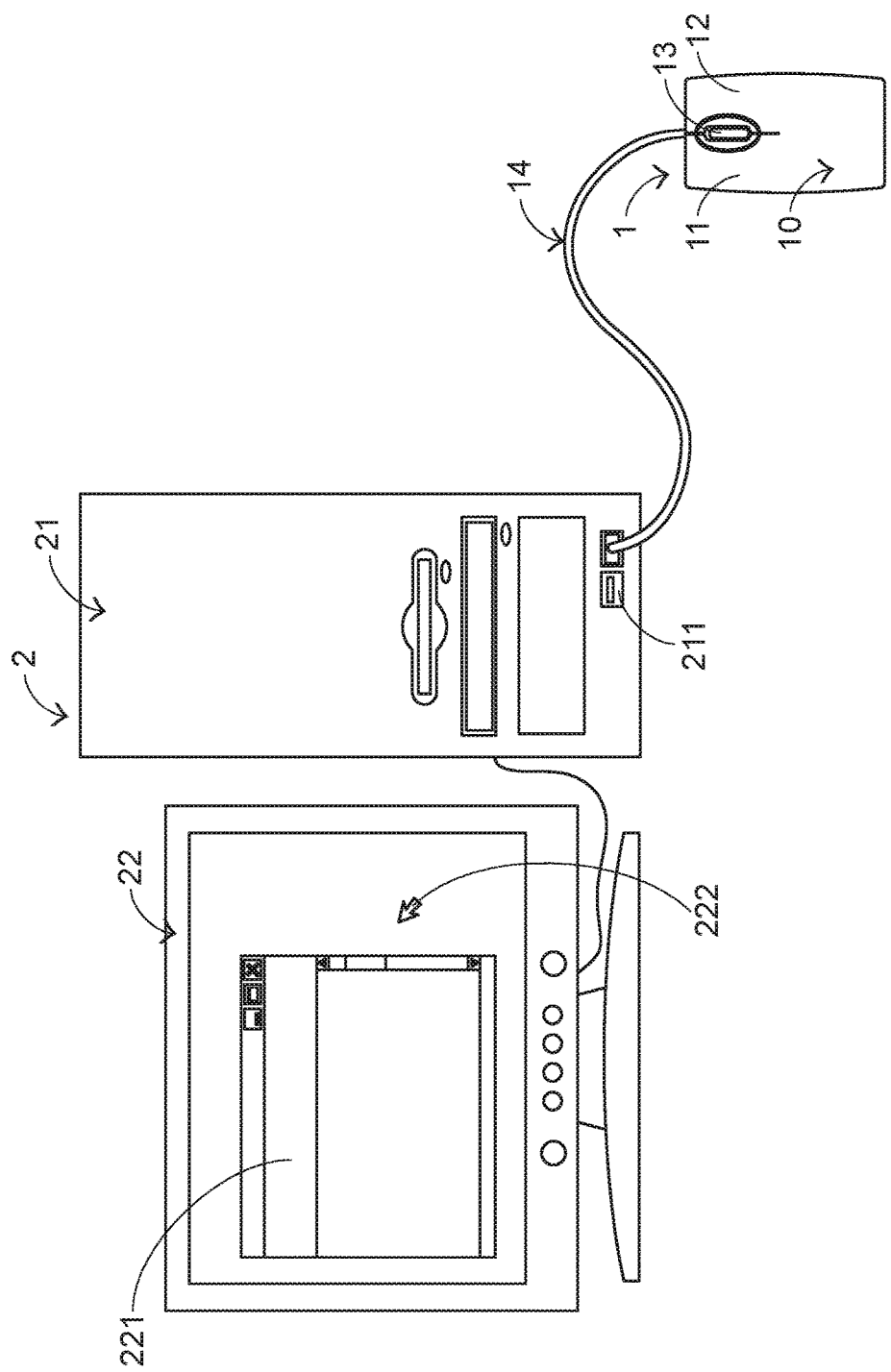
FIG. 1 is a schematic diagram illustrating the connection between a conventional mouse device and a computer system.
Figure 2:
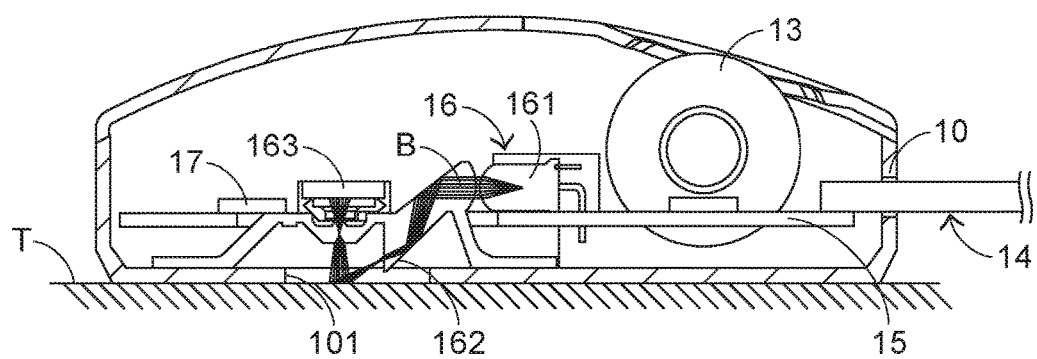
FIG. 2 is a schematic cross-sectional view illustrating the structure of the conventional mouse device.
Figure 3:
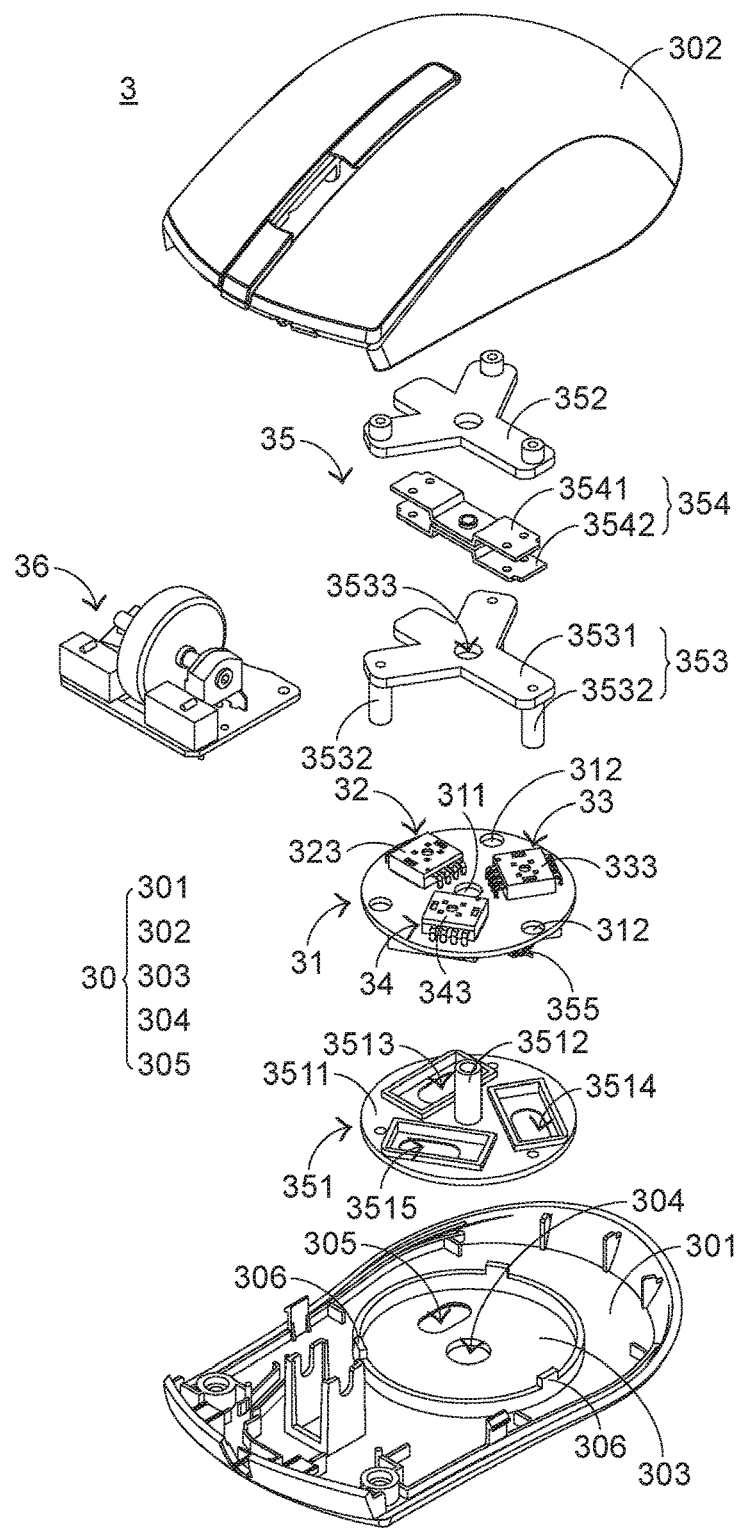
FIG. 3 is a schematic exploded view illustrating a mouse device according to a first embodiment of the present invention.
Figure 4:
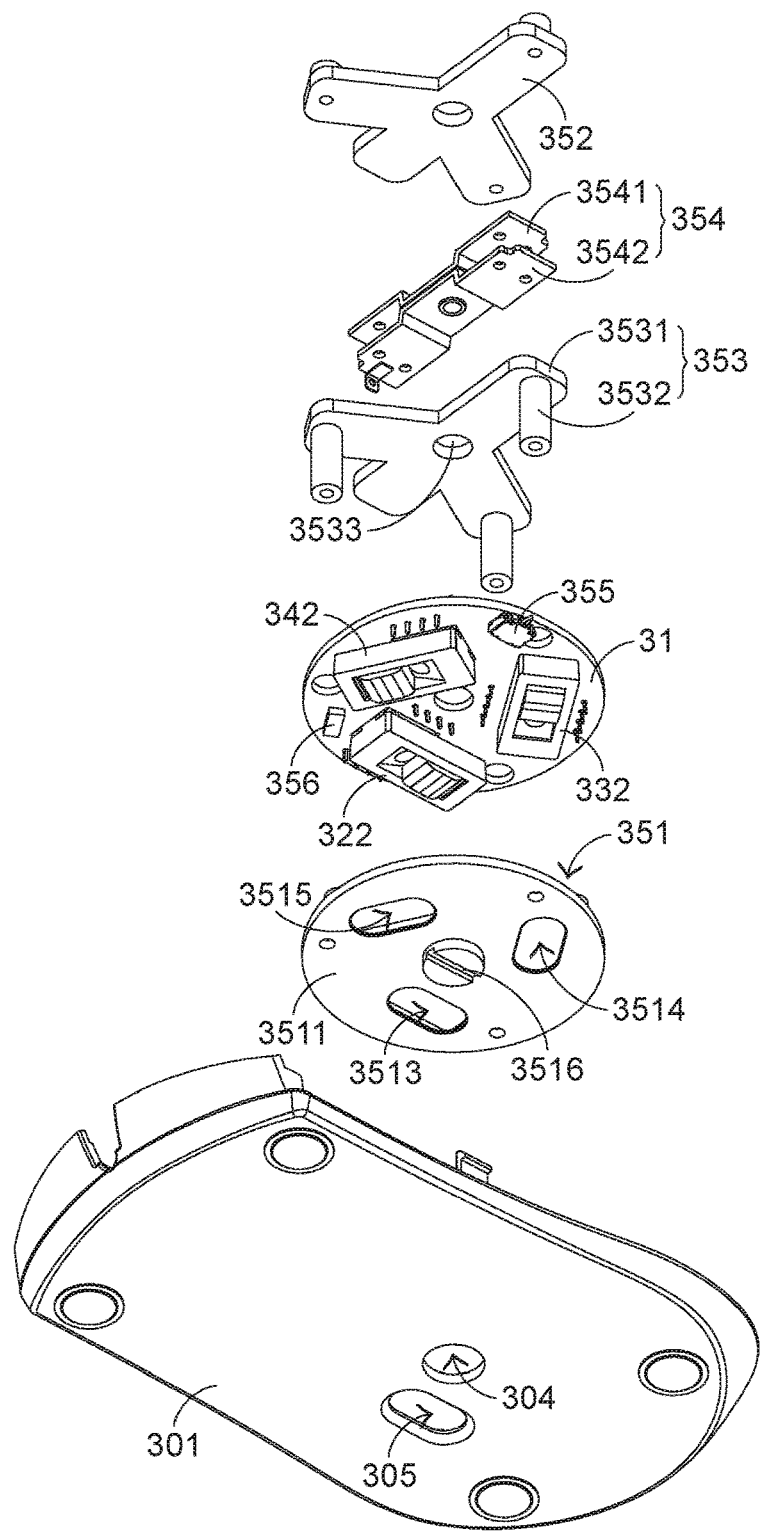
FIG. 4 is a schematic exploded view illustrating a portion of the mouse device according to the first embodiment of the present invention and taken along another viewpoint.
Figure 5:
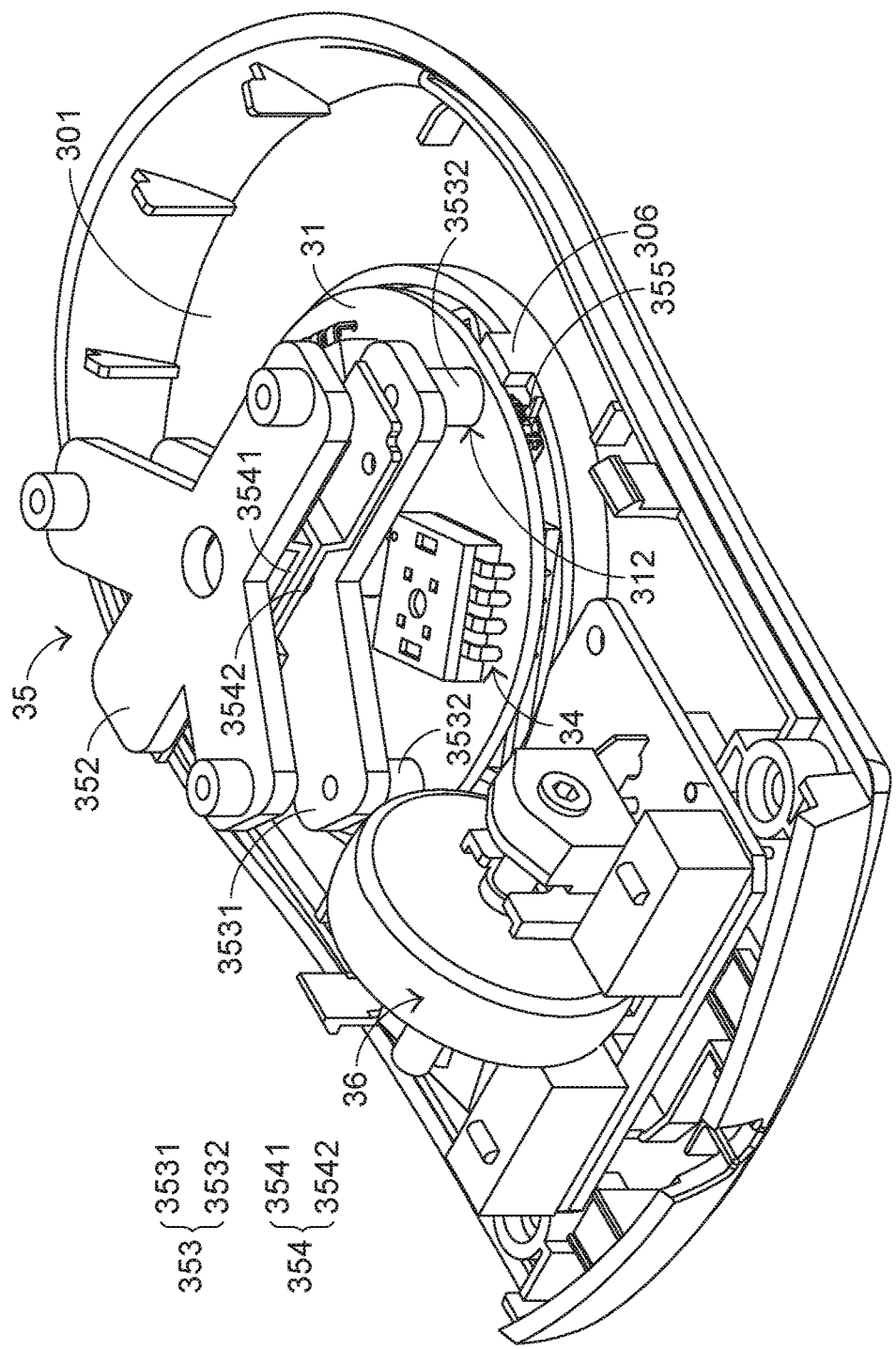
FIG. 5 is a schematic perspective view illustrating the mouse device according to the first embodiment of the present invention and taken along a further viewpoint.

Hereinafter, the structure of the mouse device of the present invention will be illustrated with reference to FIGS. 3, 4 and 5. FIG. 3 is a schematic exploded view illustrating a mouse device according to a first embodiment of the present invention. FIG. 4 is a schematic exploded view illustrating a portion of the mouse device according to the first embodiment of the present invention and taken along another viewpoint. FIG. 5 is a schematic perspective view illustrating the mouse device according to the first embodiment of the present invention and taken along a further viewpoint. The mouse device 3 is in communication with a computer system (not shown). Moreover, the mouse device 3 can control the movement of a cursor (not shown) of the computer system. In this embodiment, the mouse device 3 comprises a mouse casing 30, a circuit board 31, a first sensing module 32, a second sensing module 33, a third sensing module 34, a switching module 35 and an operation module 36.

The mouse casing 30 comprises a base 301, an upper cover 302, a receiving recess 303, a first casing opening 304 and a second casing opening 305. The base 301 is covered by the upper cover 302. The receiving recess 303 is formed in the base 301 and arranged between the base 301 and the upper cover 302. That is, the receiving recess 303 is disposed within the mouse casing 30 and not exposed to the outside. The first casing opening 304 is formed in the base 301. Moreover, the first casing opening 304 runs through the base 301. The second casing opening 305 is also formed in the base 301, and located near the first casing opening 304. Moreover, the second casing opening 305 runs through the base 301. The circuit board 31 is also disposed within the mouse casing 30. Moreover, the circuit board 31 is located over the receiving recess 303. The circuit board 31 comprises a first board opening 311 and plural second board openings 312. The first board opening 311 is located at a center of the circuit board 31. The plural second board openings 312 are located at a periphery region of the circuit board 31.

The first sensing module 32 is disposed on the circuit board 31. Moreover, the first sensing module 32 may be partially exposed outside the second casing opening 305 in response to the switching action of the switching module 35. The second sensing module 33 is disposed on the circuit board 31 and located near a first side of the first sensing module 32. Moreover, the second sensing module 33 may be partially exposed outside the second casing opening 305 in response to the switching action of the switching module 35. The third sensing module 34 is disposed on the circuit board 31 and located near a second side of the first sensing module 32. Moreover, the third sensing module 34 may be partially exposed outside the second casing opening 305 in response to the switching action of the switching module 35. The switching module 35 is partially received within the receiving recess 303 and partially exposed outside the first casing opening 304. Moreover, one of the first sensing module 32, the second sensing module 33 and the third sensing module 34 is partially exposed outside the second casing opening 305 in response to the switching action of the switching module 35. Consequently, the moving resolution of the mouse device 3 can be adjusted. The operation module 36 comprises a left button, a right button and a scroll wheel. The structures of these components are similar to those of the conventional mouse device, and are not redundantly described herein. In an embodiment, the circuit board 31 is a printed circuit board (PCB).

Please refer to FIGS. 3, 4 and 5. The switching module 35 comprises a switching plate 351, a fixing bracket 352, a connecting bracket 353, a rotary element 354, a detecting element 355 and a controlling unit 356. The switching plate 351 is received within the receiving recess 303. When the switching plate 351 within the receiving recess 303 is rotated by the user, the switching plate 351 can be rotated relative to the base 301. The switching plate 351 comprises a plate body 3511 and a protrusion post 3512. The plate body 3511 is received within the receiving recess 303 and rotatable relative to the base 301. Moreover, the plate body 3511 comprises a first hole 3513, a second hole 3514 and a third hole 3515. The first hole 3513 is aligned with the first sensing module 32. The second hole 3514 is aligned with the second sensing module 33. The third hole 3515 is aligned with the third sensing module 34. The protrusion post 3512 is disposed on the plate body 3511. Moreover, the protrusion post 3512 is penetrated through the first casing opening 304, the first board opening 311 of the circuit board 31 and the connecting bracket 353 sequentially. As the plate body 3511 within the receiving recess 303 is rotated relative to the base 301 and the second hole 3514 is aligned with the second casing opening 305, the second sensing module 33 is exposed outside the second casing opening 305. In an embodiment, the plate body 3511 and the circuit board 31 have circular shapes, and the receiving recess 303 is a circular recess.

The outward appearance of the base 301 of the mouse device 3 is also shown in FIG. 4. The switching plate 351 further comprises an adjustment part 3516. The adjustment part 3516 is disposed on the plate body 3511 and exposed outside the first casing opening 304. The fingernail, the screwdriver or any appropriate tool may be used to drive the adjustment part 3516. Since the plate body 3511 is correspondingly rotated, the switching module 35 is driven. In an embodiment, the protrusion post 3512 and the adjustment part 3516 are integrally formed with the switching plate 351.

In response to the inner layout of the mouse casing 30, the fixing bracket 352 is fixed on the upper cover 302 or the base 301. Moreover, the fixing bracket 352 is arranged between the upper cover 302 and the base 301. The connecting bracket 353 is arranged between the upper cover 302 and the base 301. The switching plate 351 and the circuit board 31 are connected with each other through the connecting bracket 353. Consequently, the circuit board 31 is synchronously rotated with the switching plate 351. In an embodiment, the connecting bracket 353 comprises a bracket body 3531 and plural connecting posts 3532. The bracket body 3531 has a central hole 3533. After the protrusion post 3512 of the switching plate 351 is penetrated through the first board opening 311, the protrusion post 3512 is inserted into the central hole 3533. Consequently, the switching plate 351 is connected with the connecting bracket 353. The plural connecting posts 3532 are connected with the bracket body 3531. Moreover, the plural connecting posts 3532 are penetrated through the corresponding second board openings 312 and contacted with the plate body 3511. When the plate body 3511 and the plural connecting posts 3532 are connected with each other through a connecting means, the switching plate 351 and the connecting bracket 353 are connected with each other and the circuit board 31 are also connected with each other. For example, the connecting means comprising screws for connecting the switching plate 351 with the connecting bracket 353. It is noted that the example of the connecting means is not restricted. In another embodiment, the connecting means comprises an engaging hole and the corresponding engaging post of the switching plate and the connecting bracket. Through the engagement between the engaging hole and the corresponding engaging post, the switching plate and the connecting bracket are connected with each other.

After the connection between the switching plate 351 and the connecting bracket 353 is established, the connecting bracket 353 is synchronously rotated with the switching plate 351. Since the plural connecting posts 3532 are penetrated through the corresponding second board openings 312, the connecting bracket 353 is rotated with the switching plate 351 and the circuit board 31 is rotated with the connecting bracket 353. In other words, the switching plate 351, the connecting bracket 353 and the circuit board 31 are synchronously rotated with each other.

Please refer to FIGS. 3, 4 and 5 again. The rotary element 354 is connected with the fixing bracket 352 and the connecting bracket 353. As the switching plate 351 is rotated, the rotary element 354 is correspondingly rotated. In an embodiment, the rotary element 354 comprises a first slab 3541 and a second slab 3542. The first slab 3541 is fixed on the fixing bracket 352. The second slab 3542 is fixed on the bracket body 3531 of the connecting bracket 353 and rotatable relative to the first slab 3541. As the plate body 3511 is rotated, the plural connecting posts 3532 are synchronously rotated with the plate body 3511 and the second slab 3542 is rotated relative to the first slab 3541 in response to the rotation of the bracket body 3531. In an embodiment, the rotary element 354 is a hinge structure, and the rotating angle of the second slab 3542 relative to the first slab 3541 is limited to be about 180 degrees.

The detecting element 355 is disposed on the circuit board 31 and located at the periphery region of the circuit board 31. The detecting element 355 is partially protruded out of the periphery region of the circuit board 31. Moreover, the detecting element 355 is used for detecting a rotating status of the switching plate 351 and generating a corresponding detecting signal. The mouse casing 30 further comprises plural bulges 306. The plural bulges 306 are formed on a periphery region of the receiving recess 303. Each bulge 306 corresponds to the sensing module 32, 33 or 34. As the circuit board 31 is rotated relative to the base 301, the detecting element 355 is selectively triggered by the bulges 306 in response to the rotation of the circuit board 31. Consequently, a corresponding detecting signal is generated. The controlling unit 356 is disposed on the circuit board 31 and electrically connected with the detecting element 355, the first sensing module 32, the second sensing module 33 and the third sensing module 34. According to the detecting signal, the controlling unit 356 controls the operations of the first sensing module 32, the second sensing module 33 and the third sensing module 34. Moreover, a first status value, a second status value and a third status value are previously stored in the controlling unit 356. When the detecting signal corresponding to the first status value is received by the controlling unit 356, the operations of the first sensing module 32, the second sensing module 33 and the third sensing module 34 are controlled by the controlling unit 356 according to the first status value.

Figure 6:
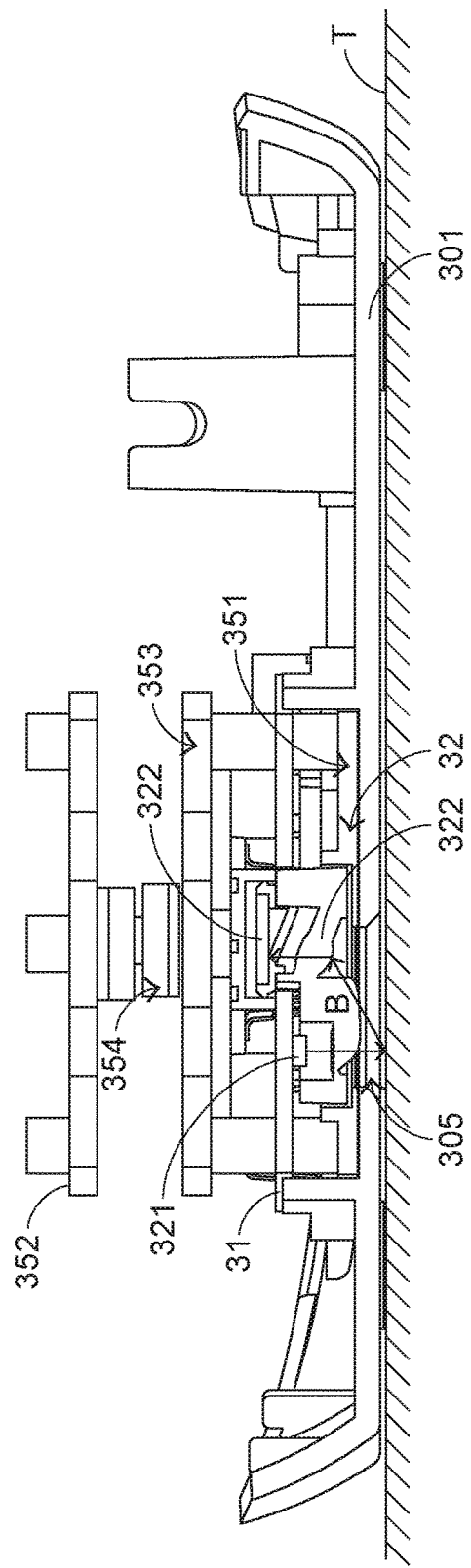
FIG. 6 is a schematic cross-sectional view illustrating a portion of the mouse device according to the first embodiment of the present invention.

The structures of the first sensing module 32, the second sensing module 33 and the third sensing module 34 will be described with reference to FIGS. 3, 4 and 6. FIG. 6 is a schematic cross-sectional view illustrating a portion of the mouse device according to the first embodiment of the present invention. The first sensing module 32 comprises a first light-emitting element 321, a first optical lens 322 and a first optical sensor 323. The second sensing module 33 comprises a second light-emitting element (not shown), a second optical lens 332 and a second optical sensor 333. The third sensing module 34 comprises a third light-emitting element (not shown), a third optical lens 342 and a third optical sensor 343. In FIG. 6, the detailed structure of the first sensing module 32 is shown. That is, the first sensing module 32 will be taken as an example for illustration. The first light-emitting element 321 is disposed on the circuit board 31 and electrically connected with the controlling unit 356. Moreover, the first light-emitting element 321 emits a light beam B. The first optical lens 322 is disposed on the circuit board 31. The light beam B can pass through the first optical lens 322. The first optical sensor 323 is disposed on the circuit board 31 and electrically connected with the controlling unit 356. After the light beam B passing through the first optical lens 322 is received by the first optical sensor 323, a working surface image is generated. In this embodiment, the first light-emitting element 321 of the first sensing module 32 is a visible light source, the second light-emitting element of the second sensing module 33 is an invisible light source, and the third light-emitting element of the third sensing module 34 is a laser light source. In other words, the first sensing module 32 is a visible sensing module, the second sensing module 33 is an invisible laser sensing module, and the third sensing module 34 is a laser sensing module. The other structures of the second sensing module 33 and the third sensing module 34 are similar to those of the first sensing module 32, and are not redundantly described herein. The principles of generating the displacement signal by the first sensing module 32, the second sensing module 33 and the third sensing module 34 are similar to those of the conventional technologies, and are not redundantly described herein.

Figure 7:
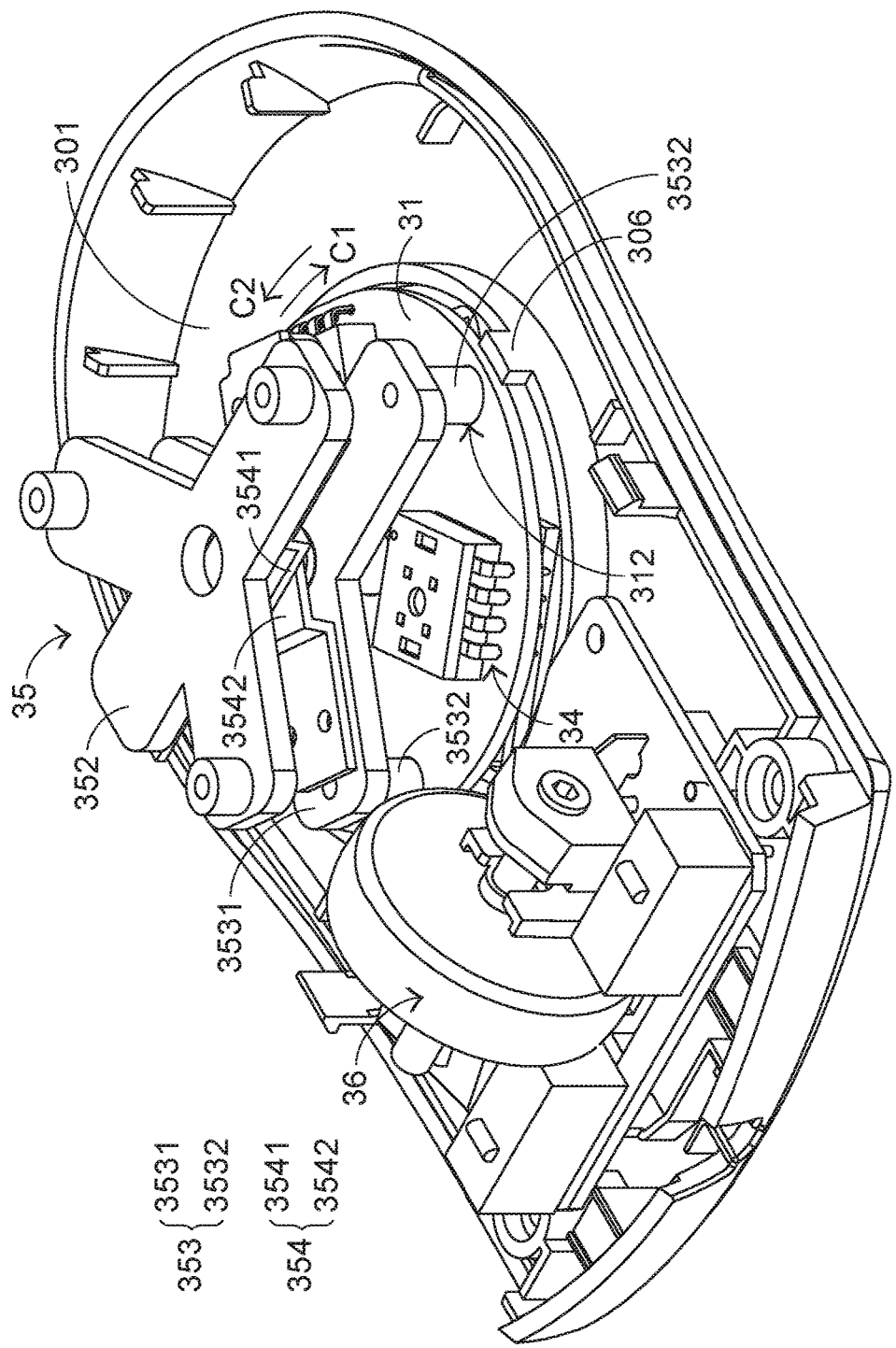
FIG. 7 is a schematic perspective view illustrating a portion of the switching module of the mouse device according to the first embodiment of the present invention.

The method of changing the operations status of the mouse device 3 through the switching module 35 will be described as follows. Please refer to FIGS. 3, 4 and 7. FIG. 7 is a schematic perspective view illustrating a portion of the switching module of the mouse device according to the first embodiment of the present invention. When the mouse device 3 is used to perform the task requiring a low moving resolution, the user may rotate the switching plate 351 in a first rotating direction C1 through the adjustment part 3516. Consequently, the plate body 3511 within the receiving recess 303 is rotated relative to the base 301 in the first rotating direction C1. In response to the rotation of the plate body 3511, the connecting bracket 353 is synchronously rotated with the plate body 3511. Consequently, the circuit board 31 is rotated with the connecting bracket 353. Moreover, since the rotary element 354 is rotated with the switching plate 351, the second slab 3542 is rotated relative to the first slab 3541. While the circuit board 31 is rotated, the bulge 306 corresponding to the first sensing module 32 is moved across the detecting element 355. Consequently, the detecting element 355 is triggered to generate the detecting signal corresponding to the first status value (e.g., 1). Moreover, the detecting signal is transmitted from the detecting element 355 to the controlling unit 356. According to the first status value, the controlling unit 356 enables the first sensing module 32 and controls the second sensing module 33 and the third sensing module 34 to enter a hibernation mode. Under this circumstance, the mouse device 3 is in an operation mode corresponding to a low moving resolution. Under control of the switching module 35, the first hole 3513 is aligned with the second casing opening 305. Meanwhile, the first sensing module 32 is exposed outside the second casing opening 305.

Similarly, the second sensing module 33 may be exposed outside the second casing opening 305 under control of the switching module 35. As the circuit board 31 is continuously rotated in the first rotating direction C1, the two bulges 306 corresponding to the second sensing module 33 and the third sensing module 34 are moved across the detecting element 355. Consequently, the detecting element 355 is triggered to generate the detecting signal corresponding to the third status value (e.g., 3). Moreover, the detecting signal is transmitted from the detecting element 355 to the controlling unit 356. According to the third status value, the controlling unit 356 enables the third sensing module 34 and controls the first sensing module 32 and the second sensing module 33 to enter the hibernation mode. Under this circumstance, the mouse device 3 is in an operation mode corresponding to a high moving resolution. As the circuit board 31 is rotated in a second rotating direction C2 and the detecting element 355 is triggered by the bulge 306 corresponding to the second sensing module 33, the detecting signal corresponding to the second status value (e.g., 2) is outputted from the detecting element 355 to the controlling unit 356. The subsequent operations of the second sensing module 33 are similar to those mentioned above, and are not redundantly described herein.

In this embodiment, the detecting element 355 is a counter. When the plate body 3511 is rotated relative to the base 301 in the first rotating direction C1, the detecting element 355 is triggered once. Consequently, the counting value of the detecting element 355 is increased by 1. Whereas, when the plate body 3511 is rotated relative to the base 301 in the second rotating direction C2, the detecting element 355 is triggered once. Consequently, the counting value of the detecting element 355 is decreased by 1.

In an embodiment, the protrusion post 3512 of the switching plate 351 has a hollow structure. The wire (not shown) connected with the circuit board 31 can be accommodated within the hollow structure of the protrusion post 3512. Consequently, the circuitry installation of the circuit board 31 is completed. Since the wire is stored within the protrusion post 3512, the wire is not rotated with the protrusion post 3512 in response to the rotation of the switching plate 351. Since the wire is not rotated, the wire is not damaged in response to excessive rotation.

From the above descriptions, one of plural sensing modules is adjusted to be exposed outside the second casing opening 305 according to the practical requirements of the user. Consequently, the suitable moving resolution is selected. Moreover, the first sensing module 32, the second sensing module 33 and the third sensing module 34 are different kinds of sensing modules. Consequently, these sensing modules are suitably used for different kinds of working surfaces. In addition to the selection of the suitable moving resolution, the suitable sensing module of the mouse device can be selected to comply with the corresponding working surface. In other words, the moving resolution of the mouse device is adjustable, and the mouse device is suitably operated on various working surfaces.

Figure 8:
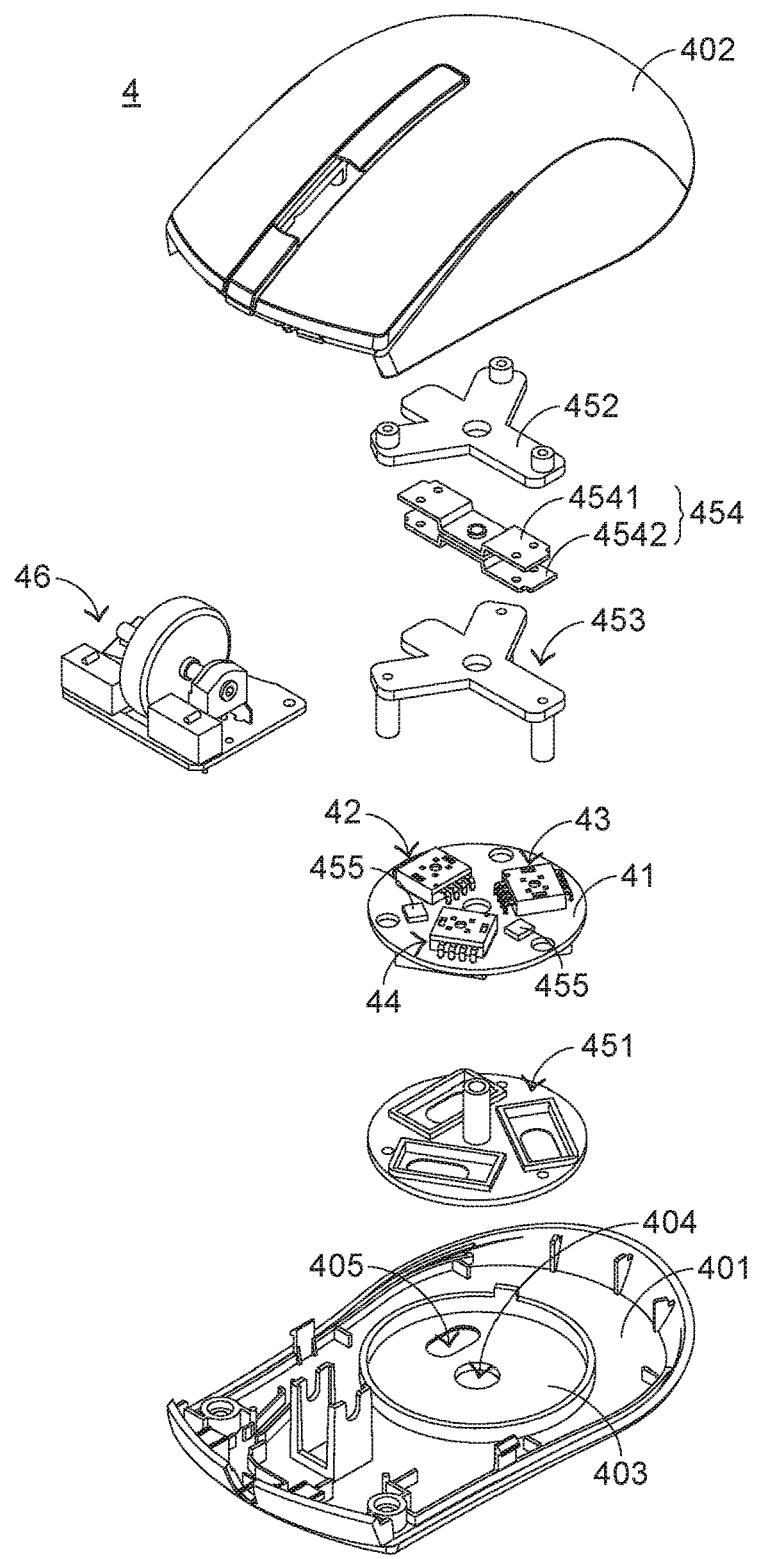
FIG. 8 is a schematic exploded view illustrating a mouse device according to a second embodiment of the present invention.
Figure 9:
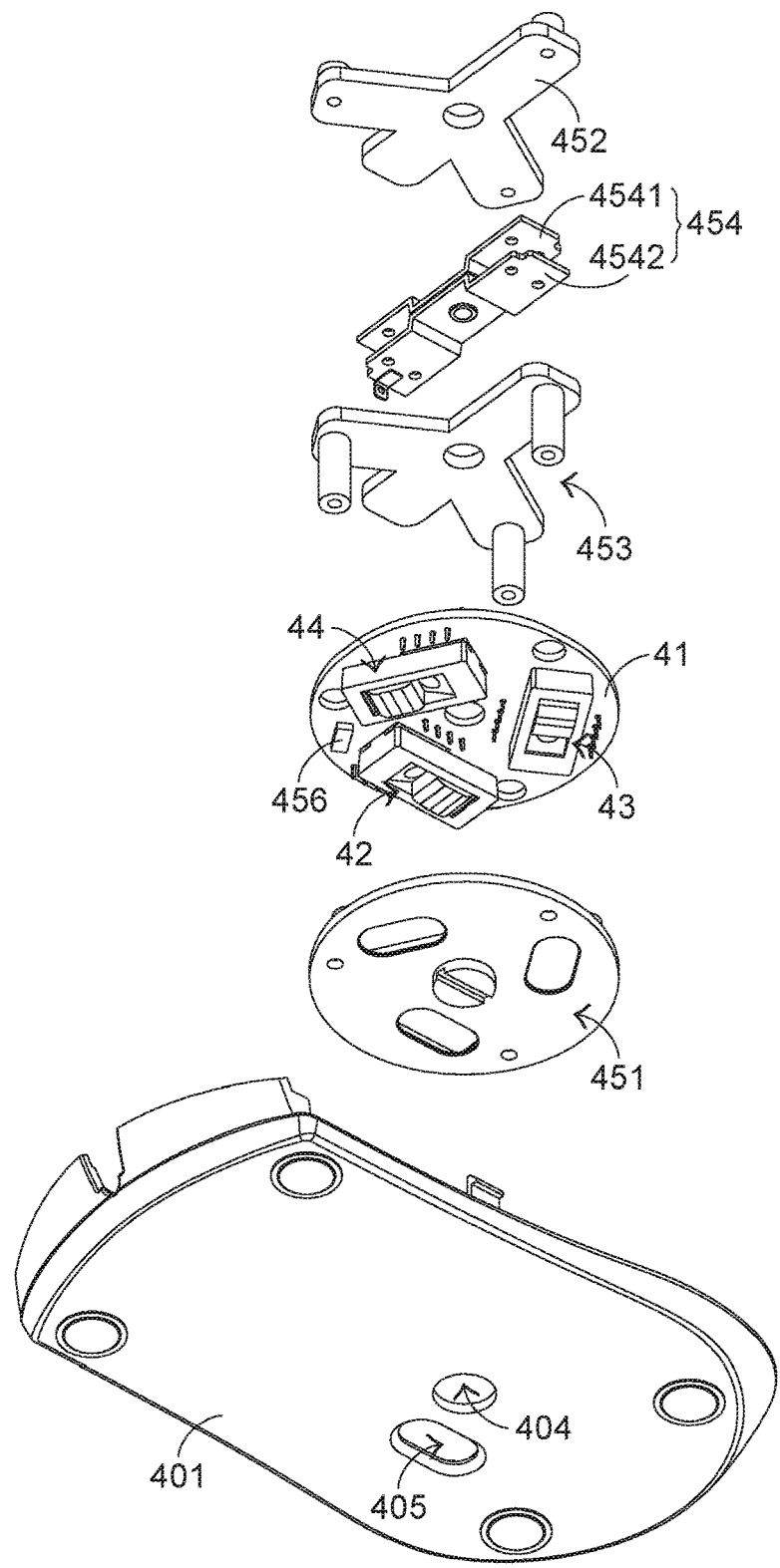
FIG. 9 is a schematic exploded view illustrating a portion of the mouse device according to the second embodiment of the present invention and taken along another viewpoint.

The present invention further provides a second embodiment, which is distinguished from the first embodiment. Please refer to FIGS. 8 and 9. FIG. 8 is a schematic exploded view illustrating a mouse device according to a second embodiment of the present invention. FIG. 9 is a schematic exploded view illustrating a portion of the mouse device according to the second embodiment of the present invention and taken along another viewpoint. In this embodiment, the mouse device 4 comprises a mouse casing 40, a circuit board 41, a first sensing module 42, a second sensing module 43, a third sensing module 44, a switching module 45 and an operation module 46. The mouse casing 40 comprises a base 401, an upper cover 402, a receiving recess 403, a first casing opening 404 and a second casing opening 405. The switching module 45 comprises a switching plate 451, a fixing bracket 452, a connecting bracket 453, a rotary element 454, plural detecting elements 455 and a controlling unit 456. Except for the switching module 45, the structures and functions of the mouse device 4 of this embodiment are substantially identical to those of the mouse device 3 of the first embodiment, and are not redundantly described herein.

As shown in FIG. 8, the switching module 45 comprises plural detecting elements 455. Each detecting element 455 is arranged between two adjacent sensing modules. In addition, the detecting element 455 is not partially protruded out of the circuit board. The rotary element 454 comprises a first slab 4541 and a second slab 4542. The second slab 4542 is rotatable relative to the first slab 4541. In an embodiment, the second slab 4542 is made of a magnetic material. As the second slab 4542 is rotated, the magnetic field is suffered from a change. Moreover, the detecting element 455 is a Hall sensor.

As the switching module 45 is operated, the second slab 4542 is rotated relative to the first slab 4541. When the second slab 4542 is transferred through a position over the detecting element 455, the magnetic field near the detecting element 455 is changed. Since the detecting element 455 is triggered by the second slab 4542, the corresponding detecting signal outputted from the detecting element 455. According to the detecting signal, the controlling unit 456 performs the subsequent operations. The subsequent operations are similar to those mentioned above, and are not redundantly described herein. Since the operations of the switching module 45 of this embodiment are distinguished from those of the first embodiment, the mouse casing 40 of this embodiment is not equipped with the plural bulges.

In the above embodiment, the detecting element 355 of the mouse device 3 is triggered by the mechanical structure, and the detecting element 455 of the mouse device 4 is triggered in response to the change of the magnetic field. It is noted that the way of triggering the detecting element is not restricted. That is, any other appropriate detecting method that is well known to those skilled in the art can be applied to the mouse device of the present invention. For example, in case that an optical sensing method is employed, an optical sensor serving as the detecting element is disposed on the circuit board and a light source for emitting the light beam is disposed on the first slab. As the circuit board is rotated, the optical detecting method is performed. The other detecting methods for the mouse device are not redundantly described herein.

From the above descriptions, the mouse device of the present invention comprises plural sensing modules. The suitable sensing module corresponding to the selected moving resolution is used according to the corresponding requirement. The mechanical structure of the switching module cooperates with the simple detecting element and the controlling unit to achieve the function of switching the sensing module. Consequently, the mouse device of the present invention is simple and cost-effective. Since the mouse device is equipped with different kinds of sensing modules, the suitable sensing module is selected according to the type of the working surface. In other words, the mouse device of the present invention is suitably operated on various working surfaces.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device in communication with a computer system for controlling movement of a cursor of the computer system, the mouse device comprising:
   a mouse casing comprising a base, an upper cover, a receiving recess, a first casing opening and a second casing opening, wherein the base is covered by the upper cover, the receiving recess is formed in the base and arranged between the base and the upper cover, the first casing opening is formed in the base, and the second casing opening is formed in the base and located near the first casing opening;
   a circuit board located over the receiving recess;
   a first sensing module disposed on the circuit board, wherein a part of the first sensing module is selectively exposed outside the second casing opening;
   a second sensing module disposed on the circuit board, wherein a part of the second sensing module is selectively exposed outside the second casing opening; and
   a switching module partially received within the receiving recess and partially exposed outside the first casing opening, wherein one of the first sensing module and the second sensing module is exposed outside the second casing opening under control of the switching module, so that a moving resolution of the mouse device is adjustable, wherein the switching module comprises:
      a switching plate received within the receiving recess, wherein the switching plate is rotatable relative to the base;
      a fixing bracket fixed on the upper cover or the base, and arranged between the upper cover and the base;
      a connecting bracket arranged between the upper cover and the base, wherein the switching plate and the circuit board are connected with each other through the connecting bracket, wherein as the connecting bracket is rotated with the switching plate, the circuit board is rotated relative to the base;

a rotary element connected with the fixing bracket and the connecting bracket, and rotated with the switching plate;

a detecting element disposed on the circuit board, wherein when a rotating status of the switching plate is detected by the detecting element, a detecting signal is generated by the detecting element; and a controlling unit disposed on the circuit board and electrically connected with the detecting element, the first sensing module and the second sensing module, wherein the controlling unit controls operations of the first sensing module and the second sensing module according to the detecting signal.

2. The mouse device according to claim 1, wherein the switching plate comprises:

a plate body received within the receiving recess and rotatable relative to the base, wherein the plate body comprises a first hole and a second hole, the first hole is aligned with the first sensing module, and the second hole is aligned with the second sensing module; and a protrusion post disposed on the plate body, and penetrated through the first casing opening, the first circuit board and the connecting bracket sequentially, wherein as the plate body is rotated and the first hole is aligned with the second casing opening, the first sensing module is exposed outside the second casing opening, wherein as the plate body is rotated and the second hole is aligned with the second casing opening, the second sensing module is exposed outside the second casing opening.

3. The mouse device according to claim 2, wherein the connecting bracket comprises:

a bracket body having a central hole, wherein the protrusion post is inserted into the central hole, so that the switching plate and the connecting bracket are connected with each other; and at least one connecting post connected with the bracket body, penetrated through the circuit board and contacted with the plate body, wherein the plate body and the at least one connecting post are connected with each other through a connecting means, so that the switching plate and the connecting bracket are connected with each other.

4. The mouse device according to claim 3, wherein the circuit board comprises:

a first board opening located at a center of the circuit board, wherein after the protrusion post is penetrated through the first board opening, the protrusion post is inserted into the central hole of the bracket body; and at least one second board opening located at a periphery region of the circuit board, wherein the at least one connecting post is penetrated through the at least one second board opening, so that the circuit board is rotated with the connecting bracket.

5. The mouse device according to claim 3, wherein the rotary element comprises:

a first slab fixed on the fixing bracket; and a second slab fixed on the bracket body of the connecting bracket and rotatable relative to the first slab, wherein as the plate body of the switching plate is rotated, the at least connecting post is synchronously rotated with the plate body, and the second slab is rotated relative to the first slab in response to rotation of the bracket body.

6. The mouse device according to claim 5, wherein as the second slab is rotated relative to the first slab and the second slab is transferred across a position over the detecting element, the detecting element is triggered by the second slab to generate the detecting signal, wherein the second slab is made of a magnetic material, and the detecting element is a Hall sensor.

7. The mouse device according to claim 1, wherein the mouse casing further comprises a bulge at a periphery region of the receiving recess, and the detecting element is partially protruded out of the circuit board, wherein as the circuit board is rotated relative to the base, the detecting element is triggered by the bulge in response to rotation of the circuit board, so that the detecting signal is generated.

8. The mouse device according to claim 1, wherein a first status value and a second status value are previously stored in the controlling unit, wherein when the controlling unit receives the detecting signal corresponding to the first status value, the controlling unit enables the first sensing module and controls the second sensing module to enter a hibernation mode, wherein when the controlling unit receives the detecting signal corresponding to the second status value, the controlling unit enables the second sensing module and controls the first sensing module to enter the hibernation mode.

9. The mouse device according to claim 1, wherein the mouse device is placed on a working surface, and the first sensing module comprises:

a light-emitting element disposed on the circuit board, and emitting a light beam;

an optical lens disposed on the circuit board, wherein the light beam is permitted to pass through the optical lens, wherein after the light beam passes through the optical lens, the light beam is projected onto the working surface and reflected to the optical lens by the working surface; and an optical sensor disposed on the circuit board, wherein when the light beam passing through the optical lens is received by the optical sensor, a working surface image is generated.

* * * * *